(12) United States Patent
Nishio et al.

(10) Patent No.: US 8,042,443 B2
(45) Date of Patent: Oct. 25, 2011

(54) DISK-SHAPED TOOL WITH VIBRATION REDUCTION

(75) Inventors: Satoru Nishio, Aichi (JP); Tomoyuki Iinuma, Aichi (JP); Yasutaka Nakajima, Aichi (JP)

(73) Assignee: Kanefusa Kabushiki Kaisha, Niwa-gun (JP)

( * ) Notice: Subject to any disclaimer, the term of this patent is extended or adjusted under 35 U.S.C. 154(b) by 205 days.

(21) Appl. No.: 10/575,479

(22) PCT Filed: Oct. 12, 2004

(86) PCT No.: PCT/JP2004/015350
§ 371 (c)(1),
(2), (4) Date: Apr. 12, 2006

(87) PCT Pub. No.: WO2005/037503
PCT Pub. Date: Apr. 28, 2005

(65) Prior Publication Data
US 2007/0056426 A1 Mar. 15, 2007

(30) Foreign Application Priority Data
Oct. 17, 2003 (JP) .................. 2003-358421

(51) Int. Cl.
*B23D 61/02* (2006.01)
*B27B 33/08* (2006.01)
(52) U.S. Cl. ............... 83/676; 83/835; 76/112
(58) Field of Classification Search .......... 83/676, 83/835, 663, 837, 839–841, 848–855; 125/15, 125/20; 76/112; D8/70
See application file for complete search history.

(56) References Cited

U.S. PATENT DOCUMENTS

| 212,813 | A | * | 3/1879 | Miller | 83/835 |
| 714,359 | A | * | 11/1902 | Brooks | 83/676 |
| 1,083,645 | A | * | 1/1914 | Wettstein | 83/835 |
| 3,872,763 | A | * | 3/1975 | Kayahara | 83/835 |
| 4,106,382 | A | * | 8/1978 | Salje et al. | 83/835 |
| 5,012,792 | A | * | 5/1991 | Kawata et al. | 125/15 |
| 5,182,976 | A | * | 2/1993 | Wittkopp | 83/835 |

(Continued)

FOREIGN PATENT DOCUMENTS
AU 675404 B3 1/1997
(Continued)

*Primary Examiner* — Clark F. Dexter
(74) *Attorney, Agent, or Firm* — Oblon, Spivak, McClelland, Maier & Neustadt, L.L.P.

(57) ABSTRACT

A disc-shaped tool includes a plurality of virtual regions formed such that it is surrounded by two radius lines extending from a rotation center of a disc-shaped base metal and two concentric circles on the base metal disposed around the rotation center. A central angle formed by the two radius lines is equal to or less than 90°, and the number of the virtual regions is 4 to 24. The concentric circle located in a center of an interval of the two concentric circles forming the virtual region is in a range of 0.6 r to 0.8 r with respect to the rotation center of the base metal when a maximum gullet bottom radius of the base metal is r. An overlapping of the virtual regions continuously adjoining each other is in a range of 0° to 12°. A minimum neighborhood distance between the adjoining slits is equal to or more than 0.05 r. A ratio of a length of an arc of the central concentric circle in each virtual region with respect to the interval of the two concentric circles in the virtual region is 3 to 6.

4 Claims, 5 Drawing Sheets

U.S. PATENT DOCUMENTS

| | | | |
|---|---|---|---|
| 5,555,788 A * | 9/1996 | Gakhar et al. | 83/835 |
| 2003/0056633 A1* | 3/2003 | Baron et al. | 83/665 |
| 2005/0193866 A1* | 9/2005 | Woo et al. | 76/112 |

FOREIGN PATENT DOCUMENTS

| | | |
|---|---|---|
| DE | 196 48 129 | 5/1998 |
| EP | 0 640 422 | 3/1995 |
| EP | 0958907 A2 | 11/1999 |
| JP | 46 21356 | 6/1971 |
| JP | 5 18010 | 5/1993 |
| JP | 6 9765 | 3/1994 |
| JP | 6-24824 | 4/1994 |
| JP | 7 33533 | 6/1995 |
| SU | 17086414 | 1/1992 |

* cited by examiner

DISK-SHAPED TOOL WITH VIBRATION REDUCTION

TECHNICAL FIELD

The present invention relates to a disc-shaped tool such as a circular saw blade used for processing whose material is not limited to any particular one, but applicable for wood, woody material, plastic, iron/steel material, nonferrous metal or the like, more particularly to a disc-shaped tool in which a vibration accompanying cutting or a buckling is unlikely to occur.

BACKGROUND ART

Conventionally, a variety of forms of slits, which are an elongated hole formed in a base metal of a circular saw blade, have been proposed for as this kind of the disc-shaped tool. For example, Japanese Patent Application Publication No. 46-21356, Japanese Utility Model Application Publication No. 5-18010, European Patent No. 0640422A1, West Germany Patent No. 19648129A1 have disclosed this kind of the circular saw blades. It has been well known that providing with such a slit increases the critical revolution number of the circular saw blade and further filling the slit with resin makes noise and vibration, which affects the quality of a cut face adversely, unlikely to occur. The critical revolution number is a revolution number which generates buckling in a circular saw blade and generally the circular saw blade is used at a revolution number below the critical one. However, how the arrangement and the entire shape of the slit are related to the stiffness and the critical revolution number of the circular saw blade and how they affect the durability and suppression of vibration have not been clarified and therefore, it is not clear whether or not a slit having an appropriate shape is formed at an appropriate position.

The inventors analyzed in detail about how the arrangement and the entire shape of the slit formed in the disc-shaped tool affect the stiffness of the disc-shaped tool, the critical revolution number and vibration, confirmed its analysis result based on specific experiment results so as to investigate those results and then reached the present invention based on those results.

The present invention intends to solve the above-described problem and provide a disc-shaped tool which has a high stiffness and high critical revolution number and ensuring a high durability and is unlikely to generate a vibration accompanying a cutting work by specifying the arrangement position and condition of the slits.

DISCLOSURE OF THE INVENTION

The feature of the configuration of the present invention to achieve the above-described object exists in a disc-shaped tool in which a plurality of virtual regions formed such that it is surrounded by two radius lines extending from a rotation center of a base metal and two concentric circles on the base metal disposed around the rotation center is disposed continuously in a circumferential direction on the disc-shaped base metal while a slit is provided in each virtual region so that it makes contact with all of the two radius lines and two concentric circles, wherein a central angle formed by the two radius lines is equal to or less than 90°, the number of the virtual regions is 4 to 24, the concentric circle located in a center of an interval of two concentric circles forming the virtual region is in a range of 0.6 r to 0.8 r with respect to the rotation center of the base metal when a maximum gullet bottom radius of the base metal is r, an overlapping of the virtual regions continuously adjoining each other is in a range of 0° to 12° in terms of the central angle around the rotation center, a minimum distance between the adjoining slits is equal to or more than 0.05 r, and a ratio q of a length of an arc of the central concentric circle in each virtual region with respect to the interval of the two concentric circles in the virtual region is 3 to 6.

According to one embodiment of the present invention, if the maximum gullet bottom radius of the base metal is assumed to be r when a circular saw blade having the slit 14 as shown in FIG. 1 is taken as a disk-shaped tool, the relation between the stiffness R (kgf/mm) and the critical revolution number min-Ncr (rpm) of the disc-shaped tool about the position in the radius direction of the central concentric circle located in the center of the two concentric circles forming the virtual region was obtained by finite element model (FEM) analysis using a computer. As the FEM analysis software, ANSYS (manufactured by ANSYS Japan) was used. As reference values of the stiffness R and the critical revolution number, the stiffness R of 0.59 kgf/mm or more and critical revolution number of 4,430 rpm or more, which are values of a circular saw blade having no slit in a conventional base metal as shown in FIG. 8 (having four slits on the outer periphery) were employed. As a result, as shown in FIG. 3, in the case where the position of the central concentric circle was over 0.6 r, the stiffness R was higher than the reference value. In the case where the position of the central concentric circle was below 0.8 r, the critical revolution number was higher than the reference value. Therefore, the position of the central concentric circle was specified to be in a range of 0.6 r to 0.8 r.

Next, the ratio q of the length of an arc in the virtual region of the central concentric circle with respect to the interval of the two concentric circles in the virtual region was obtained in the case where the position of the central concentric circle was 0.8 r and 0.6 r. When the position of the central concentric circle is 0.8 r, the ratio of the critical revolution number needs to be over 3 although there is no problem in the stiffness R as shown in FIG. 4. In the case where the position of the central concentric circle is 0.6 r, the ratio of the stiffness R needs to be below 6 as shown in FIG. 5 and there is no problem in the critical revolution number. As a result, the ratio q of the length of the arc with respect to the interval of the concentric circles was specified to be in a range of 3 to 6.

Next, an overlapping range of continuously adjoining virtual regions was obtained. In the case where the position of the central concentric circle is 0.7 r, the stiffness R has no problem if the overlapping angle is equal to or less than 12° and the critical revolution number is equal to or more than −1° as shown in FIG. 6. Further, considering an analysis result in the case where the position of the central concentric circle is 0.6 r and 0.8 r, the overlapping angle was specified to be in a range of 0° to 12°.

In the meantime, if the central angle formed by the two radius lines exceeds 90°, the stiffness of the circular saw blade drops so that four or more virtual regions are required. Even if the quantity of the virtual regions exceeds 24, the characteristic does not change so much, thereby increasing cost for forming the slit. Further if the minimum distance of adjoining slits is smaller than 0.05 r or smaller than 0.08 r under a specific severe condition, an interval between the slits is likely to be short-circuited, so that there is a fear that the circular saw blade may be damaged easily.

Further, according to one embodiment of the present invention, the plurality of virtual regions can be formed into the same shape. By forming the plurality of virtual regions into the same shape, the symmetrical property in the rotation direction of the circular saw blade is secured, thereby raising productivity and improving visual aesthetic sense.

Further, not only the plurality of virtual regions can be formed into the same shape but also the slits formed in the plurality of virtual regions can be formed into the same shape. Because the plurality of virtual regions is formed into the same shape and the slits formed in the plurality of virtual regions are formed into the same shape, the symmetrical property in the rotation direction of the circular saw blade is secured, thereby further raising productivity and improving visual aesthetic sense.

According to one embodiment of the present invention, because the arrangement position and condition of the slits to be provided in the disk-shaped tool such as the circular saw blade are specified concretely, the present invention can suppress generation of noise and vibration which affects the quality of a cut face adversely while maintaining stiffness and critical revolution number equal to or higher than a conventional circular saw blade and securing a high durability. Further, because the plurality of virtual regions is formed into the same shape and the slits in the respective virtual regions are formed into the same shape, the symmetrical property in the rotation direction of the disk-shaped tool is secured, thereby raising productivity and improving a visual aesthetic sense.

BEST MODE FOR CARRYING OUT THE INVENTION

Figure 1:
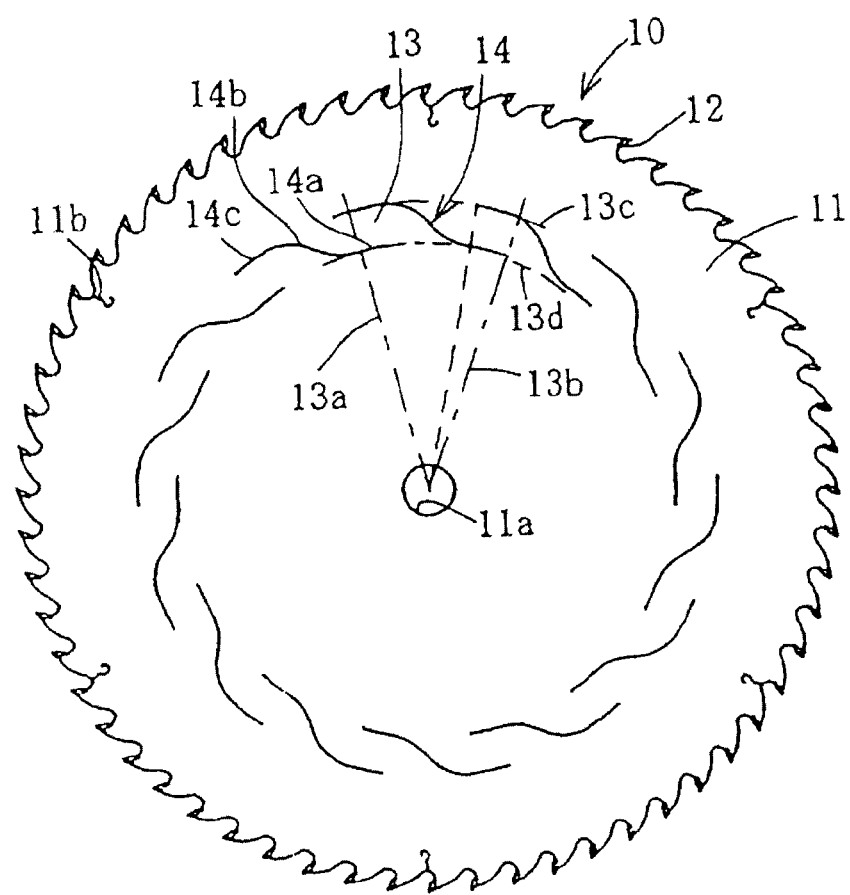
FIG. 1 is a side view showing a circular saw blade according to an embodiment of the present invention.
Figure 2:
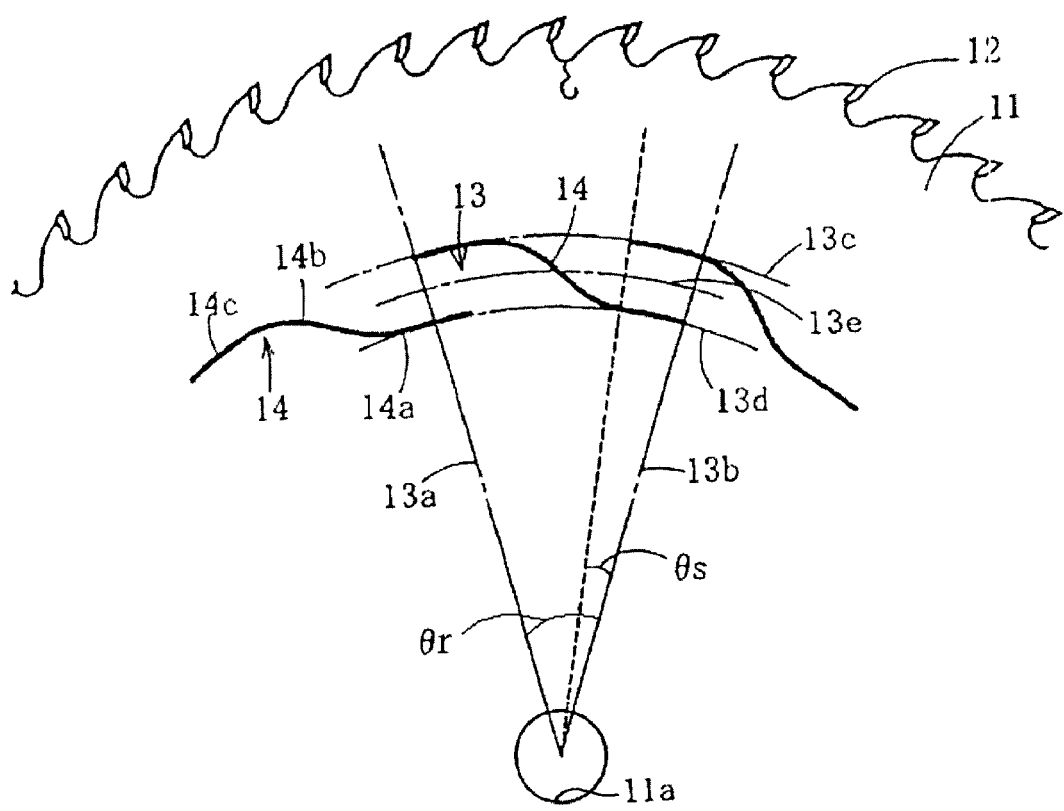
FIG. 2 is partially enlarged side view showing a major portion of the circular saw blade in enlargement.
Figure 3:
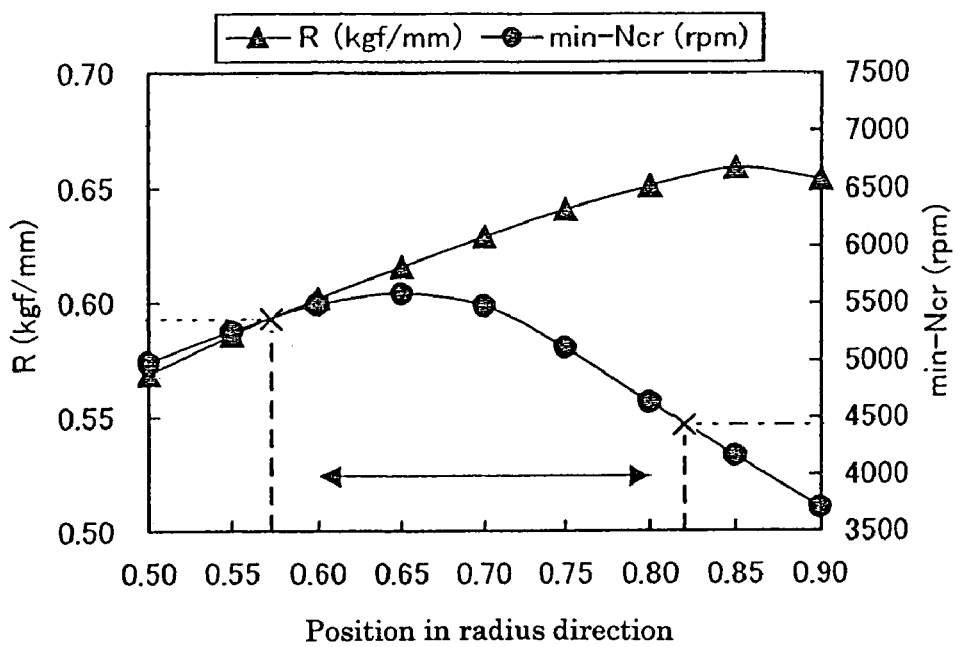
FIG. 3 is a graph showing a relation between a position in a radius direction of a center concentric circle located in a center of an interval between two concentric circles forming a virtual region of the circular saw blade, a stiffness value R (kgf/mm) and critical revolution number min-Ncr(rpm) of the circular saw blade.
Figure 4:
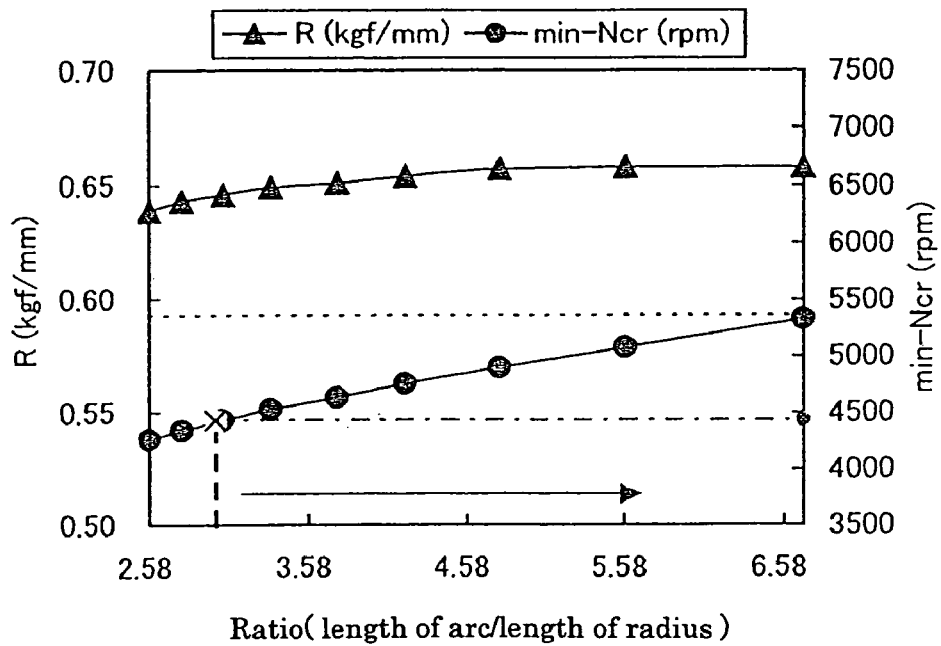
FIG. 4 is a graph showing a relation between a ratio of an arc length (the position of the central concentric circle is 0.8 r) within the virtual region of the central concentric circle with respect to the interval of the two concentric circles of each virtual region, the stiffness R and the critical revolution number min-Ncr of the circular saw blade.
Figure 5:
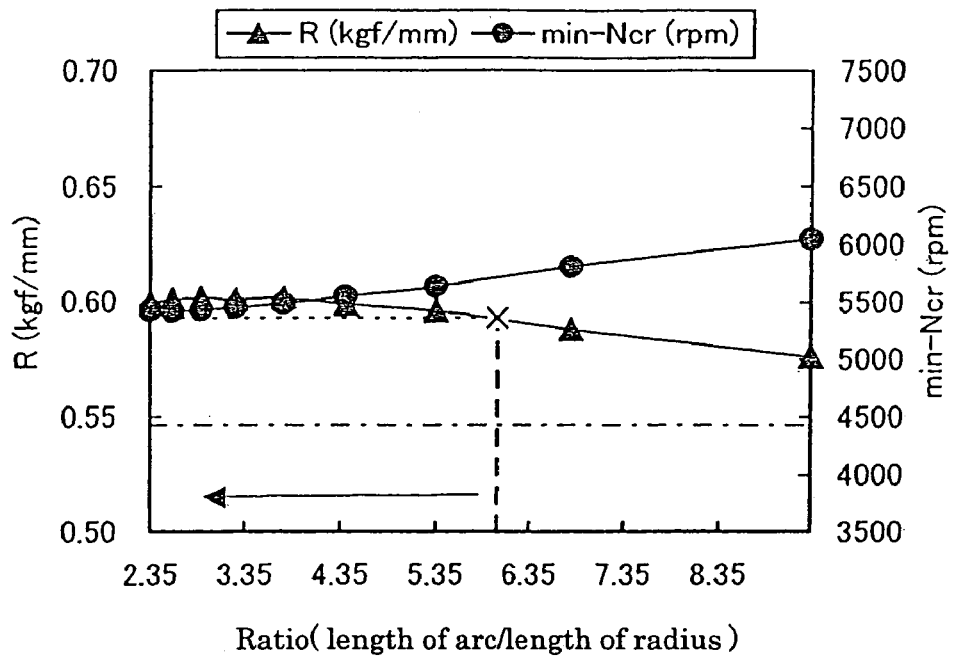
FIG. 5 is a graph showing a relation between the ratio of an arc length (the position of the central concentric circle is 0.6 r) within the virtual region of the central concentric circle with respect to the interval of the two concentric circles of each virtual region, the stiffness R and the critical revolution number min-Ncr of the circular saw blade.
Figure 6:
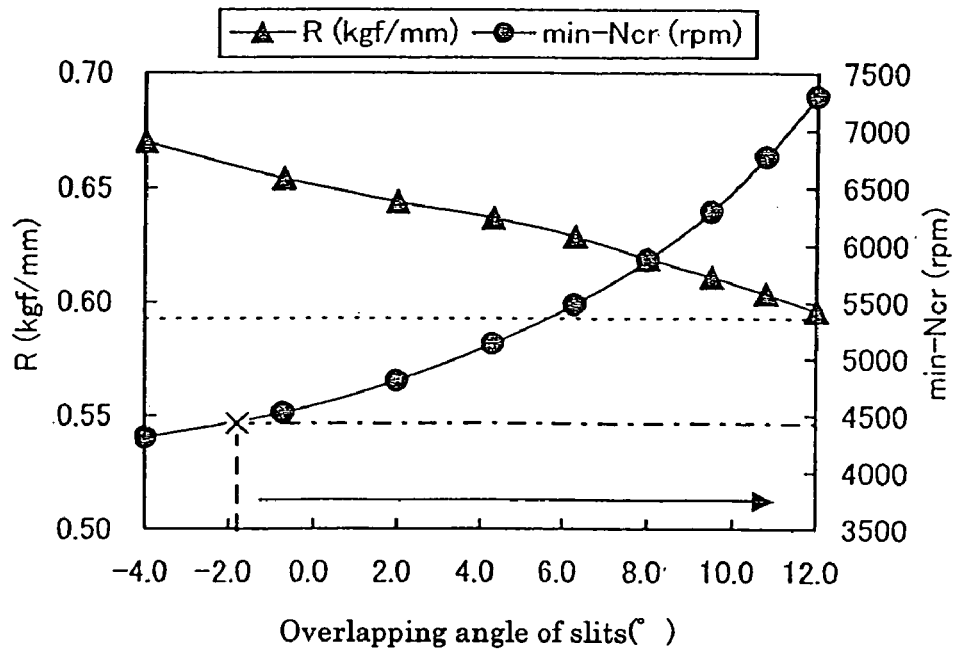
FIG. 6 is a graph showing a relation between an overlapping angle of the continuously adjoining virtual regions, the stiffness R and the critical revolution number min-Ncr of the circular saw blade.

Hereinafter, an embodiment of the present invention will be described with reference to the accompanying drawings. FIG. 1 is a side view showing a circular saw blade for cutting aluminum according to the embodiment of the present invention. FIG. 2 is a partially enlarged side view showing a major portion of the circular saw blade. The circular saw blade 10 is provided with a disc-shaped base metal 11 and teeth 12. The teeth 12 are protruded outwardly from plural positions continuously disposed at an equal interval on an outer periphery of the base metal 11. The base metal 11 has a central shaft hole 11a and outer periphery slits 11b which extend slightly from the outer periphery of each gullet bottom at six positions disposed at an equal interval in a circumferential direction while rounded in the shape of an arc internally. The base metal 11 contains fourteen virtual regions 13 which are formed by two radius lines 13a, 13b extending from a rotation center thereof and two concentric circles 13c, 13d on the base metal formed around the rotation center, the virtual regions 13 being provided continuously around the rotation center. Each of the virtual regions 13 contains a slit 14 which makes contact with the two radius lines 13a and 13b and the two concentric circles 13c and 13d, the slit 14 being formed by laser processing or the like.

As for the slit 14, a virtual region angle $\theta_r$ formed by the two radius lines 13a 13b around the rotation center is substantially 34° and is divided in terms of the virtual region angle into three sections, forward small-diameter portion 14a, central inclined portion 14b and rearward large-diameter portion 14c, which are formed continuously as viewed from the forward side in the rotation direction. A radius of the forward small-diameter portion 14a is substantially 0.64r and a radius of the rearward large diameter portion 14c is substantially 0.76r. Here, "r" indicates a radius of a maximum gullet bottom radius of the base metal 11, that is, a radius from the center of the base metal to a root of the tooth 12. The central inclined portion 14b is disposed obliquely between the forward small-diameter portion 14a and the rearward large-diameter portion 14c and a joint portion which is a boundary between the forward small-diameter portion 14a and the rearward large-diameter portion 14c is formed into an arc shape. As a consequence, the position of the central concentric circle 13e in the radius direction (position in the radius direction) located in the center of an interval between the two concentric circles 13c and 13d forming the virtual region 13 is 0.7r.

Overlapping of the continuously adjoining virtual regions 13 has a central angle $\theta_s$ of about 8.29° which is an angle around the rotation center. The minimum distance between the adjoining slits 14 is about 0.1 r. The ratio q (slit horizontal to vertical ratio q) of the length of an arc of 0.415 r within the virtual region 13 of the central concentric circle 13e with respect to an interval between the two concentric circles in each one of the virtual regions 13 of 0.104 r is about 3.99.

According to the embodiment having the above-described structure, the arrangement position and condition of the slit 14 to be provided in the circular saw blade 10 are specified within the above-described numeric range. As a result, the embodiment can raise the durability and suppress generation of noise and vibration affecting the quality of a cut face adversely while holding a stiffness and critical revolution number characteristic which are equivalent to or higher than a conventional circular saw blade having no slit in its base metal. Further, because the slit 14 formed within each one of the virtual regions 13 is formed into the same shape as well as the shape of each of the plurality of virtual regions 13 is formed into the same shape, a symmetrical property in the rotation direction of the circular saw blade 10 is secured and productivity and visual aesthetic sense are intensified. However, the plurality of virtual regions does not always need to have the same shape or the shape of the slit does not always need to be identical.

Next, a modification of the above embodiment will be described.

Figure 7:
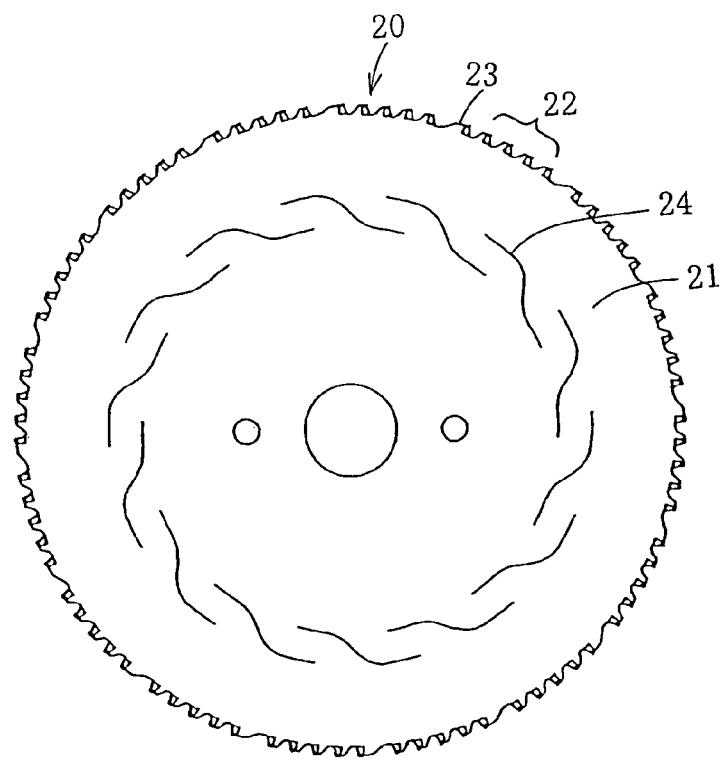
FIG. 7 is a side view showing a circular saw blade according to a modification.

A circular saw blade 20 of the modification is so constructed that as shown in FIG. 7, four teeth 22 arranged at an equal interval of one pitch continuously and a tooth 23 shifted by a 1.5 pitch from this are projected as a combination outwardly in the diameter direction from a plurality of positions of the outer periphery of a disc-shaped base metal 21. The quantity of the teeth 22 arranged at the equal interval may be three or five although it is most preferred to be four. The configuration of the slit 24 formed on the base metal 21 and the virtual region (not labeled) are the same as the slit 14 and the virtual region 13 of the above embodiment.

The circular saw blade 20 of the modification secures the same effect as the above embodiment by providing with the predetermined slits 24 and it has been made evident that including one tooth 23 shifted in pitch in the plurality of teeth 22 arranged at the equal pitch is very effective for cutting a metal pipe such as steel and iron.

Next, specific experiments of the above-described embodiment and the modification will be described.

As the test piece, test pieces 1 for cutting aluminum material of the embodiment and test pieces 2 for cutting steel/iron of the modification were prepared. The test pieces 1 are circular saw blades based on three kinds of specifications (outside diameter×tooth thickness×base metal thickness×central hole diameter×number of teeth) ① to ③ having the above-described slit structure as shown in Table 1 below, these circular saw blades having six outer periphery slits extending by 10 mm from the outer periphery to the rotation center. The cutting condition is a revolution number N and a feeding speed F, which is different for each one of the circular saw blades. An object material to be cut is aluminum extruded material A6063.

The test pieces 2 are circular saw blades based on two kinds of specifications ①, ② having the above described slit structure (outside diameter×tooth thickness×base metal thickness×central hole diameter×number of teeth) and have no slits on the outer periphery. The cutting condition is a revolution number N and a feeding speed F, which are common. The object materials to be cut are respective kinds of steel pipes, STKM13C, 15A, and 15B.

Figure 8:
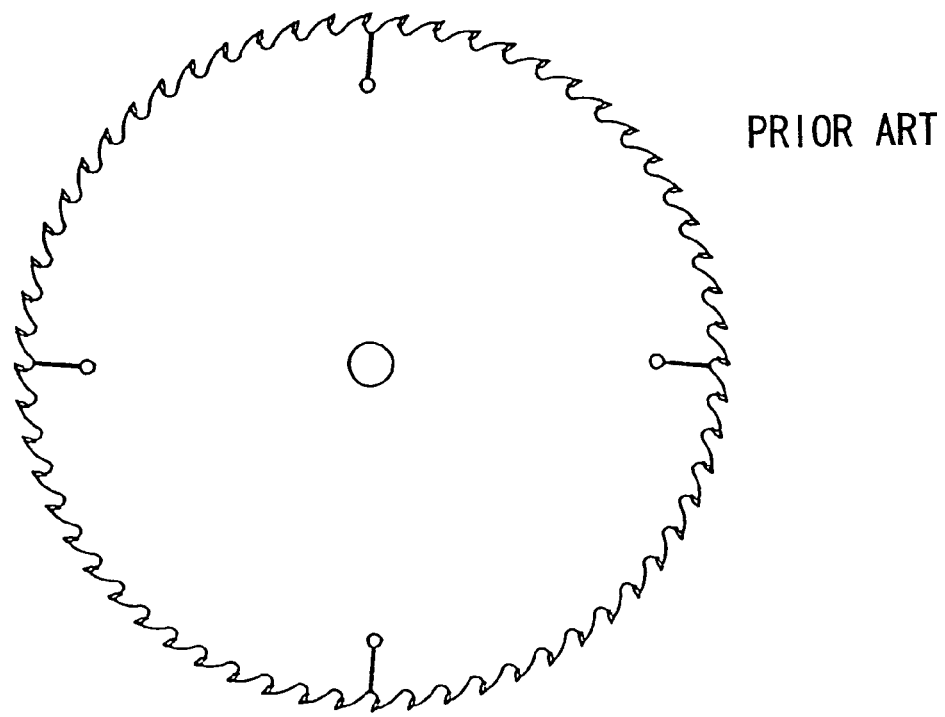
FIG. 8 is a side view showing a conventional circular saw blade.

The result of the experiment shows the durability of both the test pieces 1 and 2 is raised by about 1.5 times as compared with a conventional circular saw blade 100 shown in FIG. 8. That is, this is a result produced because the stiffness and the critical revolution number of the test pieces are raised as compared with those of a conventional product. Because the critical revolution number is raised, vibration accompanying a cutting work is suppressed more as compared with the conventional product, thereby suppressing generation of noise and raising the processing accuracy on a cutting face.

Although in the above embodiment, the gullet bottom of the circular saw blade is formed uniformly, the gullet bottom may be nonuniform and in that case, as the value of r, the maximum gullet bottom radius is used. In the above-described embodiment, generation of vibration is intended to be suppressed while maintaining the stiffness and critical revolution number appropriately by specifying the slit to be provided in the circular saw blade. Such a slit specifying condition is not restricted to the circular saw blade but applied to other disc-shaped rotation cutting tools, for example, a disc cutting grinding stone, a circular slitter knife and the like.

INDUSTRIAL APPLICABILITY

The present invention is very advantageous for design or the like of a disk-shaped tool in that the arrangement position and the entire shape of the slit formed in the disc-shaped tool is defined, thereby raising the stiffness and the critical revolution number of the disc-shaped tool, such that generation of vibration can be suppressed.

The invention claimed is:
1. A disc-shaped tool comprising:
a plurality of overlapping virtual regions so formed as to be surrounded by two radius lines extending from a rotation center of a disc-shaped base metal and two concentric circles on the base metal disposed around the rotation center, said virtual regions overlapping continuously in a circumferential direction on the disc-shaped base metal, each virtual region overlapping each adjacent virtual region in the circumferential direction, while an entire slit is provided in each one of the virtual regions, the slit making contact with all of the two corresponding radius lines and the two concentric circles, wherein the slits all make contact with the same two concentric circles,

TABLE 1

|  | Test pieces 1(for aluminum) | Test pieces 2(for the pipe) |
| --- | --- | --- |
| Position in radius direction 0.6~0.8 | 0.7 times of gullet bottom radius | 0.7 times of gullet bottom radius |
| Overlapping angle 0°~12° | 6.29° | 6.29° |
| Slit horizontal to vertical ratio 3~6 times | 3.76 times | 3.76 times |
| Specifications of the circular saw blades | ① Φ405 × T2.0 × t1.5 × Φ25.4 × 144Z<br>② Φ610 × T3.3 × t2.7 × Φ40 × 138Z<br>③ Φ650 × T3.5 × t3.0 × Φ40 × 138Z<br>* Outer periphery slits 10 mm × 6 | ① Φ285 × T2.0 × t1.75 × Φ40 × 80Z<br>② Φ285 × T1.6 × t1.3 × Φ40 × 80Z<br>* No outer periphery slits |
| Cutting condition | ① N = 4,500 rpm, F = 5 m/min<br>② N = 3,000 rpm, F = 5 m/min<br>③ N = 2,830 rpm, F = 5 m/min | Both ①, ②<br>N = 130 rpm, F = 0.52 m/min |
| Durability (compared with a conventional circular saw blade) | About 1.5 times | About 1.5 times |
| Object materials to be cut | Respective kinds of shapes made of aluminum extruded materials A6063 | STKM13CΦ20.38 × t3<br>STKM15AΦ22.38 × t2<br>STKM15BΦ51.2 × t3.1 | wherein each end portion of each slit extends so as to form an arc that is substantially coincident with a respective one of the concentric circles, wherein a virtual region angle around the rotation center formed by the two radius lines from a same virtual region is equal to or less than 90°;

the virtual regions are 4 to 24 in number;

a central concentric circle located in a center of an interval of the two concentric circles forming the virtual region is in a range of 0.6 r to 0.8 r with respect to the rotation center of the base metal when a maximum gullet bottom radius of the base metal is r;

an overlapping of the virtual regions continuously adjoining each other is in a range of 0° to 12° in terms of a central angle around the rotation center, the central angle formed by two radius lines from adjacent virtual regions;

a minimum distance between adjacent slits is equal to or more than 0.05 r; and a ratio q of a length of an arc of the central concentric circle extending across all of the virtual region with respect to a radial distance between the two concentric circles in the virtual region is $3 \leqq q \leqq 6$.

2. The disc-shaped tool according to claim 1 wherein each of the plurality of virtual regions has a same shape.

3. The disc-shaped tool according to claim 2 wherein the slits formed in the plurality of virtual regions are of the same shape.

4. The disc-shaped tool according to claim 1 wherein 3-5 teeth are arranged at an edge of the base metal within each virtual region.

* * * * *